July 25, 1944.  R. S. BIGELOW  2,354,360
LOADING STATION FOR SHUTTLE CARS
Filed Sept. 6, 1943   3 Sheets-Sheet 1
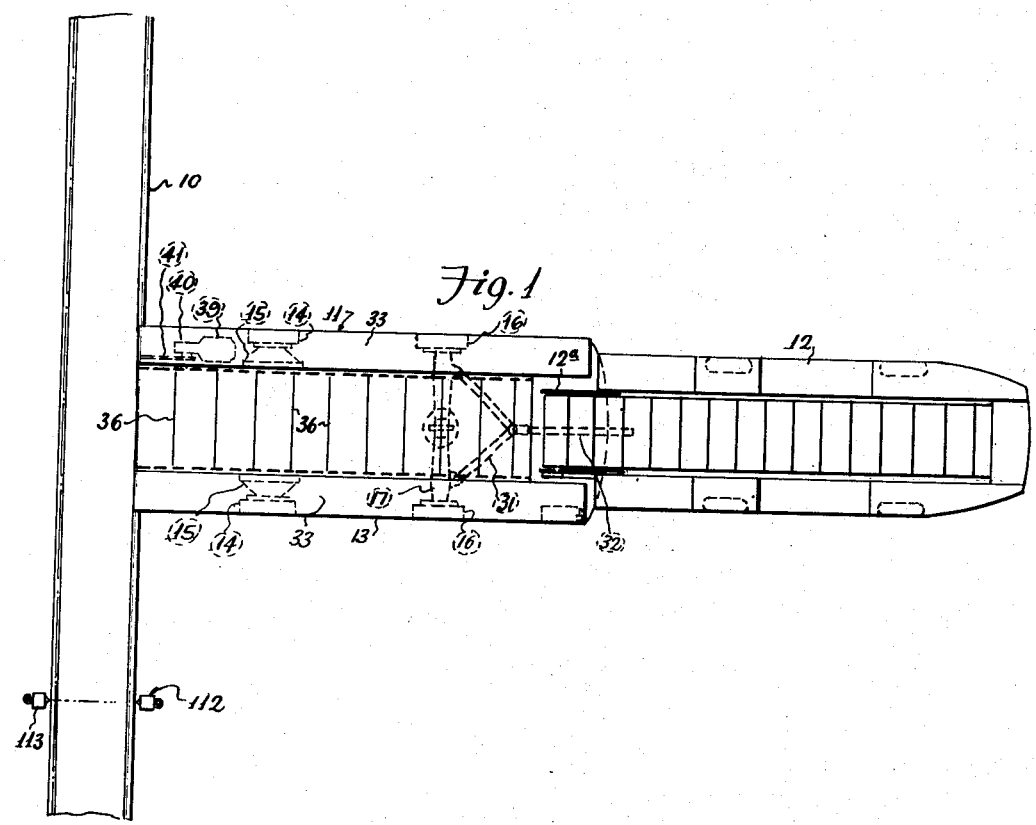
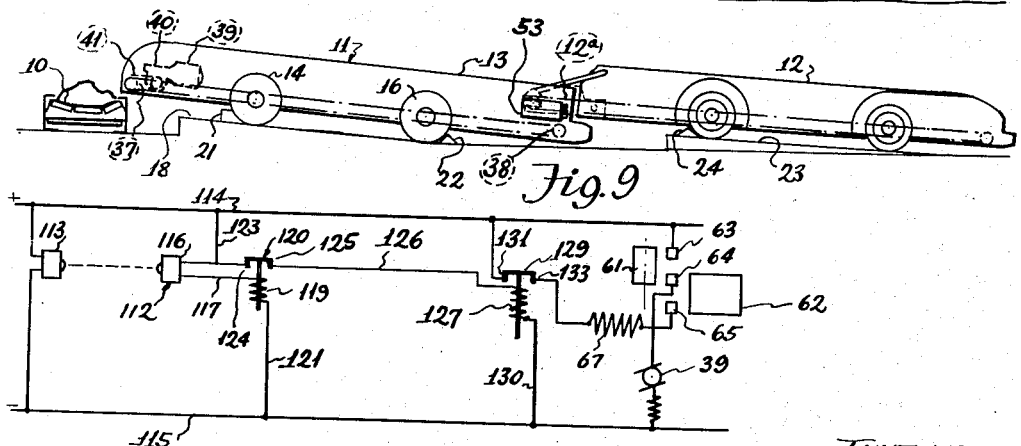
INVENTOR
Roy S. Bigelow
Clarence F. Poll
ATTORNEY July 25, 1944.  R. S. BIGELOW  2,354,360
LOADING STATION FOR SHUTTLE CARS
Filed Sept. 6, 1943  3 Sheets-Sheet 2
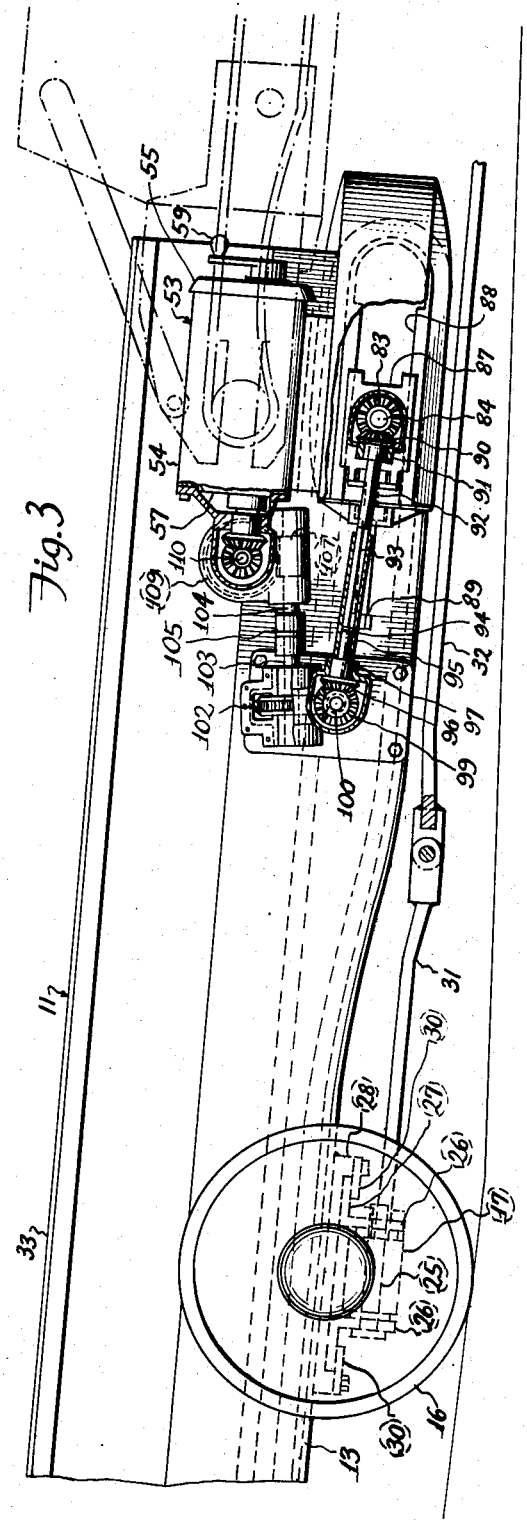
INVENTOR
Roy S. Bigelow
Clarence F. Poole
ATTORNEY July 25, 1944.  R. S. BIGELOW  2,354,360
LOADING STATION FOR SHUTTLE CARS
Filed Sept. 6, 1943  3 Sheets-Sheet 3
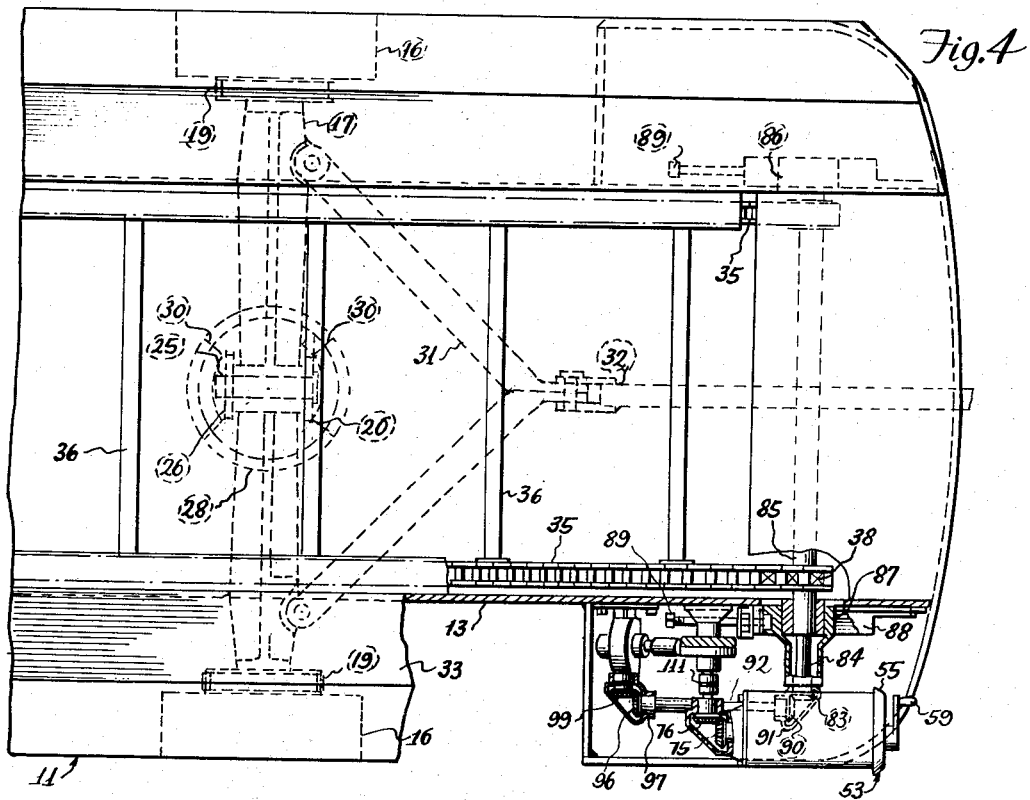
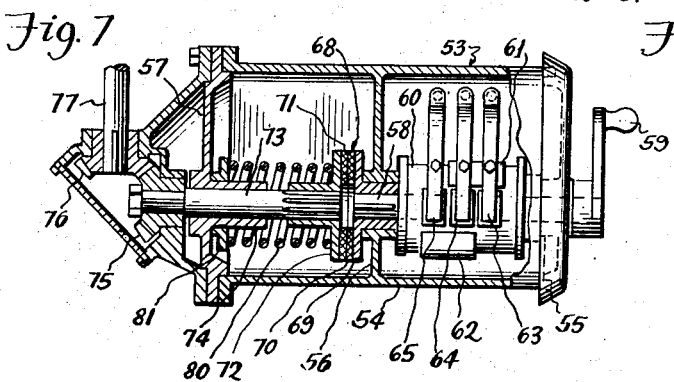
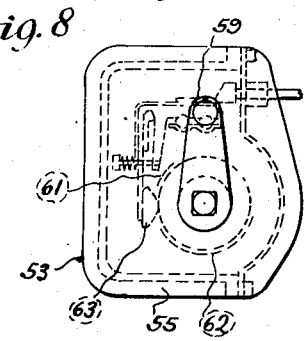
INVENTOR
Roy S. Bigelow
Clarence F. Poole
ATTORNEY Patented July 25, 1944

2,354,360

UNITED STATES PATENT OFFICE 2,354,360

LOADING STATION FOR SHUTTLE CARS

Roy S. Bigelow, Chicago, Ill., assignor to Goodman Manufacturing Company, Chicago, Ill., a corporation of Illinois Application September 6, 1943, Serial No. 501,369

15 Claims. (Cl. 214—1)

This invention relates to improvements in loading stations for loading loose material from a shuttle car onto a main line conveyer.

Shuttle cars are usually unloaded into a loading station consisting of a hopper sunk in the ground and having a conveyer extending along its bottom and arranged to elevate the material and discharge it into mine cars or the like. They also have been arranged to discharge their load onto an elevating conveyer which discharges the material directly onto a main line conveyer. Loading stations consisting of a hopper and conveyer will adequately take care of the material discharged by the shuttle car, but such stations are expensive and uneconomical because mining operations utilizing shuttle cars are confined to a concentrated area in the mine. When this area is mined out, which is a relatively short time, the loading station must be moved to a new location in order to make the most efficient use of the shuttle cars. Also, the shuttle car in order to be a paying proposition must come up to its loading station, completely discharge its load, and start away for a new load in from ten to twenty seconds, and the load receiving means must be able to take care of this discharged load either by storing it during the discharge period or by taking it away from the shuttle car as fast as it is discharged. Since the rate of travel of the main line conveyer is about a third of the rate of discharge of the car, and since it is impractical to increase the capacity of the main line conveyer to the rate of discharge of the car, the discharge of material from the shuttle cars directly onto the main line conveyer, or onto an elevating conveyer which elevates the coal onto a main line conveyer, is too slow to be practical. Moreover, where an elevating conveyer is used as a loading station, a number of shuttle cars usually discharge onto the same conveyer from separate loading stations and care must be taken that the shuttle car does not discharge onto a section of the conveyer that is already loaded.

The principal objects of my invention are to provide a novel form of conveying means for taking care of the loose material discharged from a shuttle car at its rated capacity, which will automatically discharge its load onto a main line conveyer after the shuttle car has left its loading station, to pick up a new load of material.

A more specific object of my invention is to provide a simplified form of automatic loading station for shuttle cars, which will take material away from the shuttle cars at the maximum rate of discharge of the cars, and which is automatically operable to discharge this material onto a main line conveyer at the rate at which the conveyer is capable of taking material away from the loading station, after the shuttle car has left its loading station.

Another object of my invention is to provide a loading station for receiving and storing the material discharged from a shuttle car, which will automatically load this material onto a main line conveyer and stop when the main line conveyer is in a loaded condition.

A more specific object of my invention is to provide a loading station for a shuttle car including a portable transfer conveyer adapted to receive material discharged from the shuttle car at the maximum rate of discharge from the shuttle car, and to then discharge the material onto a main line conveyer, at the capacity of the conveyer, and to automatically stop when the transfer conveyer has been completely unloaded and at any time when the main line conveyer is in a loaded condition.

Other objects of my invention will appear from time to time as the following specification proceeds and with reference to the accompanying drawings wherein:

Figure 1 is a plan view of a loading station constructed in accordance with my invention, showing a shuttle car in a discharge position;

Figure 2 is a view in side elevation of the loading station shown in Figure 1;

Figure 3 is an enlarged side view of the receiving end of the transfer conveyer of the loading station, with certain parts broken away and certain other parts shown in longitudinal section;

Figure 4 is a plan view of the receiving end of the transfer conveyer of the loading station, with certain parts broken away and certain other parts shown in horizontal section;

Figure 5 is a fragmentary transverse sectional view showing certain details of construction of the transfer conveyer;

Figure 6 is a partial fragmentary transverse sectional view showing certain other details of the transfer conveyer not shown in Figure 5;

Figure 7 is a view of the electric controller for controlling operation of the transfer conveyer, with certain parts broken away and certain other parts shown in horizontal section;

Figure 8 is an end view of the controller shown in Figure 7; and

Figure 9 is a wiring diagram diagrammatically showing the electrical control connections to the transfer conveyer.

In the drawings, a main line conveyer 10 is shown as extending along a mine entry. Said main line conveyer may be of any type but is herein shown as being a belt conveyer, and is adapted to receive material from a number of loading stations spaced therealong, only one of said loading stations being shown herein.

A transfer conveyer 11 serves as a loading station for the conveyer 10 and is arranged at right angles with respect to said main line conveyer 10 for discharging material therein, and forms a self-loading and unloading receptacle, for receiving and storing material discharged from a shuttle car 12.

The shuttle car 12 is adapted to travel about the mine in a well known manner, to transport material from a loading machine to the transfer station. Said shuttle car may be of a type somewhat similar to that illustrated in a prior application Serial No. 496,861, filed by me on July 31, 1943, and is no part of my present invention so will not herein be shown or described in detail. Said shuttle car, as herein shown, has a discharge end 12a which may form a closure member for the end of the car and which may be lowered and extend within said transfer conveyer.

The transfer conveyer 11 is herein shown as being of a mobile type including a frame or body 13 mounted on a pair of rear supporting wheels 14, 14, which are mounted on opposite sides of said body on axle structures indicated generally by reference characters 15, 15. A pair of front wheels 16, 16, mounted on a transverse axle 17, are provided to form a steering support for the front end of said body. Said front axle is arranged to have supporting connection with said body intermediate its ends, and is movable with respect to said body about a vertical axis intersecting the longitudinal center line of said body, to permit turning of the front wheels. Said transfer conveyer is preferably run onto a ramp 18 so as to elevate its discharge end over the top of the belt conveyer 10, as in Figure 2. Friction brake bands 19, 19 are adapted to engage brake drums 20, 20 connected with the front wheels to hold said wheels from rotation when on the ramp 18 (see Figure 5). Said brake bands may be engaged with or disengaged from said brake drums in any suitable manner, and are not herein shown or described in detail since they form no part of my present invention. Blocks 21, 22 may be placed behind the rear wheels of said transfer conveyer and ahead of the front wheels of said conveyer, respectively, to serve as chocks to hold said transfer conveyer in a stationary position during the loading operation. The shuttle car 12 may also be run up onto a ramp 23, with its discharge end 12a extending within the body of said transfer conveyer. Blocks 24, 24 may be provided to abut the steering wheels of the car and limit movement thereof along said ramp, said car being held stationary during unloading by means of its brakes, in a well known manner.

The transversely extending axle 17, which has the front steering wheels 16, 16 mounted at its opposite ends, is pivotally mounted to the body 13, intermediate its ends, on a longitudinally extending pin 25, which is mounted in a pair of parallel spaced ears 26, 26 depending from a pivoted plate 27. Said plate has a circular periphery, and is mounted in a circular recessed guide member 28, secured to the bottom of a bottom plate 29 of the body 13. Retaining gibs 30, 30 are secured to the bottom of said guide member and abut the bottom of said plate to retain said plate within said guide and to permit pivotal movement of said plate and axle about a vertical axis. A yoke 31 is pivotally connected to said axle adjacent opposite sides thereof and has a tongue 32 transversely pivoted thereto, which extends forwardly beyond the forward end of the car and forms a means for hauling the car about the mine from one loading place to another and for turning the axle 17 about its vertical axis.

The body 13 of the transfer conveyer 11 is relatively wide, with laterally spaced outwardly flared side walls 33, 33 and having a bottom plate 34 connected between said side walls and forming the bottom of the material carrying compartment of the conveyer. Two laterally spaced endless conveyer chains 35, 35, having flights 36, 36 spaced therebetween, are guided for movement along said bottom to progress material along said body, from the receiving to the discharge end thereof. The lower runs of said endless chains are supported on the bottom plate 29 which extends across the lower ends of said side walls, and which also forms a reinforcing structure for the body of said conveyer. The material carrying compartment of said body is of a slightly greater capacity than the shuttle car 12, so as to receive and store all of the material discharged from said shuttle car.

The endless chains 35, 35 extend from the plate 34 around drive sprockets indicated generally by reference character 37, at the discharge end of the conveyer, and along the top of the bottom plate 29 to idler sprockets 38, 38 at the receiving end of the conveyer. Said chains pass around said idler sprockets and along the bottom plate 34 to the drive sprockets 37, 37, to progress material along said bottom plate from the receiving to the discharge end thereof. The drive to said conveyer chains includes a drive motor 39 having drive connection with said chains through a speed reducer generally indicated by reference character 40 and a chain and sprocket drive 41 driven from said speed reducer. Said speed reducer and drive connection are not herein shown or described in detail since they form no part of my present invention.

Electric power is supplied to the drive motor 39 through a controller indicated generally by reference character 53, herein shown as being disposed at the left-hand front end of the transfer conveyer, in a position so it may be operated by the operator of the shuttle car 12 while in the operating compartment of said shuttle car. Said controller, as herein shown, includes a casing 54 having a cover 55, an intermediate wall 56, and rear end wall 57. The cover 55 of said casing and said intermediate wall form bearing support means for a drum shaft 58 of said controller. A control handle 59 is mounted on the outer end of said drum shaft, and a control drum 60 is mounted on said shaft between said cover and intermediate wall.

The control drum 60 is provided with two contacts 61 and 62. The contact 61 is adapted to be engaged by contact fingers 63 and 64, while said contact 62 is adapted to be engaged by the contact finger 64 and a contact finger 65. The turning of said control handle 59 from an extreme off position in a counterclockwise direction will first engage the contact 62 with the contact fingers 64 and 65, to start the motor 39 through a resistance 67, to cause said motor to rotate at a slow speed, and will then engage the contact 61 with the contacts 63 and 64, to cut said resistance from the motor circuit and cause said motor to operate at a high speed, which is substantially the speed of discharge of the shuttle car 12.

A means is provided, which is driven by the conveyer 11, for turning the control drum 60 in a direction which in Figure 8 is shown as being a clockwise direction, to an off position. The reduction between said conveyer and said control drum is such that said control drum will be driven at a speed which will move the contact 62 from a position in engagement with the contact fingers 64, 65, to a position out of engagement with said contact fingers when the chains 35, 35 and flights 36, 36 have travelled along the plate 34 a distance sufficient to progress all of the material in said car from the receiving to the discharge end thereof. This will cause said transfer conveyer to stop by itself after the shuttle car and its operator have left said transfer conveyer and said transfer conveyer has fully discharged its load. Said means, as herein shown, includes a friction disk clutch 68 having a flanged member 69 journaled in the intermediate wall 56 and keyed on the inner end of the drum shaft 58 (see Figure 7). Said clutch member is provided with an annular friction disk 70, which is adapted to be engaged by an annular friction disk 71 on a clutch member 72, splined on a longitudinally extending shaft 73 coaxial with the shaft 58. Said shaft 73 is journaled in a bearing boss 74 extending inwardly from the end wall 57 of said controller casing, and has a bevel gear 75 on its outer end which is adapted to be meshed with and driven from a bevel gear 76. Said last mentioned bevel gear is keyed to a longitudinally extending shaft 77, driven from the conveyer chains 35, 35 in a manner which will hereinafter more clearly appear as this specification proceeds.

A compression spring 80 encircles the shaft 73 and abuts the clutch member 72 at one of its ends, to engage the annular disk 71 with the annular disk 70. The opposite end of said spring abuts a collar 81 mounted on the boss 74 and abutting the end wall 57. Said compression spring is sufficiently strong to drive the shaft 58 and drum 60 from said shaft 73, but is not strong enough to prevent the operator from operating the control handle 59 and turning said control drum 60 against said shaft 73, or to hold said control handle and control drum from rotation, during rotation of said shaft.

The operator may thus turn the control drum to first start the transfer conveyer through the resistance 67 and may then cut the resistance from the motor circuit, to cause the motor 39 to drive the transfer conveyer at substantially the speed of discharge of the shuttle car 12. The control drum may then be turned to an off position or to a position where the contact 62 comes into engagement with the contact fingers 64 and 65 to cause operation of said transfer conveyer at a slow speed.

The drive connection from the conveyer chains 35, 35 to the shaft 73 includes a bevel pinion 83 keyed on a reduced end 84 of a transverse shaft 85. Said shaft has the idler sprockets 38, 38 mounted thereon, and is journaled in bearing blocks 86, 87, which are mounted for slidable adjustable movement along the conveyer body 13 in longitudinal guides 88, 88, to take up slack in the conveyer by means of adjusting screws 89, 89 having connection with said bearing blocks, in a manner well known to those skilled in the art. The bevel pinion 83 meshes with a bevel pinion 90 journaled on its hub in an outwardly projecting housing portion 91 of the bearing block 87. Said bevel pinion is keyed on the forward end of a longitudinal shaft 92, which has a squared rear end portion 93 adapted to slidably engage a correspondingly squared inside of a sleeve 94 secured to a shaft 95, for driving said shaft in all positions of the bearing block 87 along the guide 88. A bevel gear 96, keyed to the end of said shaft and journaled on its hub in a housing 97, meshes with a bevel gear 99 on a transversely extending shaft 100. A worm 101 on said transverse shaft meshes with and drives a worm gear 102 on a longitudinally extending shaft 103. Said shaft is connected with a coaxial shaft 104 by means of a coupling 105. A worm 107 on said last mentioned shaft meshes with a worm gear 109 on a transverse shaft 110. Said transverse shaft is coaxial with the shaft 77 and drives said shaft through a coupling 111, in a manner well known to those skilled in the art.

Thus when the transfer conveyer is operating at a slow speed and the operator's hand is removed from the control handle 59, the shaft 73 will be rotatably driven in a clockwise direction, to cause the contact 62 to move along the contact fingers 64 and 65 until a point is reached where said contact fingers are disengaged from said contact. At this time the motor 39 will be stopped.

Referring now in particular to Figure 9 and the control means for stopping operation of the transfer conveyer 11, when the belt conveyer 10 is fully loaded with material, and then again starting said conveyer when the loaded portion of the belt passes beyond the discharge end of said transfer conveyer, a photoelectric relay 112 is provided. Said photoelectric relay may be of any type well known to those skilled in the art and includes a light source 113 connected to a positive conductor 114 and to a negative conductor 115. Said conductors have connection with the motor 39, for supplying power to said motor. Said light source projects a light beam across the belt conveyer 10, at a point disposed in advance of the transfer conveyer 11, to a holder having a photoelectric cell therein and indicated generally by reference character 116. A conductor 117 leads from the photoelectric cell to a coil 119 of a relay 120, and a conductor 121 connects said coil to the negative line 115. A conductor 123 is connected between the positive line 114 and said photoelectric cell to supply power thereto. Said conductor is also connected to a contact 124 of the relay 120 which is adapted to be engaged by a movable contact 125, to complete a circuit to a line 126 connected with a coil 127 of a relay 129, to energize said coil. The relay 129 is adapted to close a circuit between a contact 131 connected with the line 114 and a contact 133 connected with the resistance 67.

When the light beam projected on the photoelectric cell 116 by the light source 113 is unbroken, current will flow from the positive line 114 through the line 117, coil 119 to the negative line 115, to energize said coil and close the relay 120 and line 126. This will energize the coil 127 of the relay 129, to close said relay, and will start the motor 39 through the resistance 67, when the contact 62 is in engagement with the contact fingers 64 and 65. When, however, the light beam is interrupted, the coil 119 will be deenergized and the relay 120 will open. This will open the line to the coil 127 of the relay 129, to deenergize said coil and open said relay and stop the motor 39. When the object breaking the light beam has passed by, the circuit will again be completed through the coil 119, to close the relays 120 and 129 and cause the motor 39 to again be operated at a slow speed through the resistance 67.

It should here be noted that the relay controls operation of the motor 39 through the resistance 67 only, and has no control over said motor when operating at a high speed. The reason for this is that when said motor is operating at a high speed, the transfer conveyer is being loaded by the shuttle car, and there is no discharge of material from said conveyer to the belt conveyer 10.

During operation of the device, the shuttle car 12 may be run up on the ramp 23 in a position to discharge into the receiving end of the transfer conveyer 11. The operator of the shuttle car may then turn the control handle 59 in a clockwise direction from an off position, to first engage the contact 62 with the contact fingers 64 and 65 to start the motor 39 through the resistance 67, and then engage the contact 61 with the contact fingers 63 and 64, to drive said motor at a high speed which is substantially the speed of discharge of the shuttle car. At the same time, the operator starts the shuttle car conveyer, holding one hand on the control handle 59, to hold the contact 61 in engagement with the contact fingers 63 and 64 against the rotating shaft 73 and clutch member 69. As soon as the shuttle car has been entirely unloaded, the operator may turn the control handle 59 to a position to engage the contact 62 with the contact fingers 64 and 65 and cause the motor 39 to operate at a slow speed through the resistance 67. The operator and shuttle car may then leave the transfer conveyer to pick up another load of material, said conveyer discharging onto the belt conveyer 10 at a relatively slow speed until said transfer conveyer has been entirely unloaded, at which time the contact 62 will be moved out of engagement with the contact fingers 64 and 65, and operation of the conveyer will be stopped until the next shuttle car comes along to discharge its load thereon. If the belt conveyer 10 is carrying a load at any time the transfer conveyer is discharging material thereon, said load will break the beam from the light source 113 to stop operation of said transfer conveyer until the loaded portion of the conveyer has passed by said light beam.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In an automatic loading station for shuttle cars, a transfer conveyer having sufficient capacity to receive and store the entire load carried by a shuttle car, means for driving said transfer conveyer at the speed of unloading of said shuttle car for receiving the load discharge by said shuttle car, said means being operable to drive said transfer conveyer at a slower speed, for discharging its load as the shuttle car moves away from said transfer conveyer.

2. In an automatic loading station for shuttle cars, a transfer conveyer, a main line conveyer, said transfer conveyer having sufficient capacity to receive and store the entire load carried by a shuttle car and having its discharge end arranged in cascade relation with respect to said main line conveyer, means for driving said transfer conveyer at the speed of unloading of said shuttle car, for receiving the load discharged by said shuttle car, said means being operable to drive said transfer conveyer at a slower speed for discharging its load onto said main line conveyer, as the shuttle car moves away from said conveyer, and means operable to automatically stop operation of said transfer conveyer when discharging onto said main line conveyer and said main line conveyer is in a loaded condition in advance of said transfer conveyer.

3. In an automatic loading station for shuttle cars, a transfer conveyer, a main line conveyer, said transfer conveyer having sufficient capacity to receive and store the entire load carried by a shuttle car and having its discharge end arranged in cascade relation with respect to said main line conveyer, means for driving said transfer conveyer at the speed of unloading of said shuttle car, for receiving the load discharged by said shuttle car, said means being operable to drive said transfer conveyer at a slower speed for discharging its load onto said main line conveyer, as the shuttle car moves away from said conveyer, and means operable to stop operation of said transfer conveyer when discharging onto said main line conveyer and said main line conveyer is in a loaded condition in advance of said transfer conveyer, including a photoelectric relay operatively connected with said transfer conveyer and controlled by a light beam extending across said main line conveyer at a point disposed in advance of said transfer conveyer, so as to stop said transfer conveyer when said light beam is broken by material on said main line conveyer.

4. In an automatic loading station for shuttle cars, a transfer conveyer having a storage capacity slightly greater than the capacity of a shuttle car and having its discharge end arranged in cascade relation with respect to a main line conveyer, a drive motor for said transfer conveyer, operatively connected with said transfer conveyer, to drive said transfer conveyer at the unloading speed of said shuttle car, and a controller for controlling operation of said motor, said controller being operable to cause said motor to rotate at a slow speed to drive said conveyer at a speed slower than the unloading speed of said shuttle car, for unloading material onto said main line conveyer when said shuttle car moves away from said main line conveyer.

5. In an automatic loading station for loading material from a shuttle car onto a main line conveyer, a transfer conveyer having a storage capacity slightly greater than the capacity of the shuttle car and having its discharge end arranged in cascade relation with respect to the main line conveyer, a drive motor for said transfer conveyer, operatively connected with said transfer conveyer, to drive said transfer conveyer at the unloading speed of said shuttle car, a controller for controlling operation of said motor, said controller being operable to cause said motor to rotate at a slow speed to drive said conveyer at a speed slower than the unloading speed of said shuttle car, for unloading material onto said main line conveyer when said shuttle car moves away from said main line conveyer, and a drive connection to said controller, for turning said controller to an off position when said transfer conveyer has travelled a distance sufficient to discharge its entire load onto said main line conveyer.

6. In an automatic loading station for loading material from a shuttle car onto a main line conveyer, a transfer conveyer having a storage capacity slightly greater than the capacity of the shuttle car and having its discharge end arranged in cascade relation with respect to the main line conveyer, a drive motor for said transfer conveyer, operatively connected with said transfer conveyer, to drive said transfer conveyer at the unloading speed of said shuttle car, a controller for controlling operation of said motor, said controller being operable to cause said motor to rotate at a slow speed to drive said conveyer at a speed slower than the unloading speed of said shuttle car, for unloading material onto said main line conveyer, when said shuttle car moves away from said main line conveyer, and a drive connection from said motor to said controller, for turning said controller to an off position, when said transfer conveyer has travelled a distance sufficient to discharge its entire load onto said main line conveyer.

7. In an automatic loading station for loading material from a shuttle car onto a main line conveyer, a transfer conveyer having a storage capacity slightly greater than the capacity of the shuttle car and having its discharge end arranged in cascade relation with respect to the main line conveyer, a drive motor for said transfer conveyer, operatively connected with said transfer conveyer, to drive said transfer conveyer at the unloading speed of said shuttle car, a controller for controlling operation of said motor, said controller being operable to cause said motor to drive said transfer conveyer at a speed slower than the unloading speed of said shuttle car, for unloading material onto said main line conveyer, when said shuttle car moves away from said main line conveyer, and a drive connection from said motor to said controller, for turning said controller to an off position, when said transfer conveyer has travelled a distance sufficient to discharge its entire load onto said main line conveyer, said drive connection including means to permit said controller to be manually held from movement during operation of said motor and transfer conveyer, to permit the operator to hold said controller against rotation by said drive connection, to a position to drive said transfer conveyer at a high speed.

8. In an automatic loading station for loading material from a shuttle car onto a main line conveyer, a transfer conveyer having a storage capacity slightly greater than the capacity of the shuttle car and having its discharge end arranged in cascade relation with respect to the main line conveyer, a drive motor for said transfer conveyer, operatively connected with said transfer conveyer, to drive said transfer conveyer at the unloading speed of said shuttle car, a controller for controlling operation of said motor, said controller being operable to cause said motor to drive said transfer conveyer at a speed slower than the unloading speed of said shuttle car, for unloading material onto said main line conveyer, when said shuttle car moves away from said main line conveyer, and a drive connection from said motor to said controller, for turning said controller to an off position, when said transfer conveyer has travelled a distance sufficient to discharge its entire load onto said main line conveyer, said drive connection including a slip clutch arranged to permit said controller to be manually turned against said drive means and to be held from movement against said drive means during operation of said motor and transfer conveyer, to permit the operator to move and hold said controller to a position to drive said transfer conveyer at a high speed during operation of said drive connection.

9. In an automatic loading station for loading material from a shuttle car onto a main line conveyer, a transfer conveyer having a storage capacity slightly greater than the capacity of the shuttle car and having its discharge end arranged in cascade relation with respect to the main line conveyer, a drive motor for said transfer conveyer, operatively connected with said transfer conveyer, to drive said transfer conveyer at the unloading speed of said shuttle car, an electrical controller, electrical connections from said controller to said motor, for connecting said controller to control operation of said motor, said controller being operable to cause said motor to drive said transfer conveyer at a speed slower than the unloading speed of said shuttle car, for unloading material onto said main line conveyer when said shuttle car has moved away from said main line conveyer, and means operable to stop said transfer conveyer when discharging onto said main line conveyer at a slow speed and said main line conveyer is in a loaded condition in advance of said transfer conveyer including a photoelectric relay operatively connected with said controller and electrical connections, and having a light beam extending across said main line conveyer at a point disposed in advance of said transfer conveyer so as to stop operation of said transfer conveyer when said light beam is broken by material on said elevating conveyer.

10. In an automatic loading station for loading material from a shuttle car onto a main line conveyer, a transfer conveyer having a storage capacity slightly greater than the capacity of the shuttle car and having its discharge end arranged in cascade relation with respect to the main line conveyer, a drive motor for said transfer conveyer, operatively connected with said transfer conveyer, to drive said transfer conveyer at the unloading speed of said shuttle car, a controller for controlling operation of said motor, said controller being operable to cause said motor to drive said transfer conveyer at a speed slower than the unloading speed of said shuttle car, for driving said shuttle car to unload material onto said main line conveyer, when said shuttle car moves away from said main line conveyer, a drive connection from said motor to said controller, for turning said controller to an off position, when said transfer conveyer has travelled a distance sufficient to discharge its entire load onto said main line conveyer, and means having connection with said controller for stopping said transfer conveyer when said controller is in a position to connect said motor to drive said transfer conveyer at a slow discharging speed including a photoelectric relay having a light beam extending across said main line conveyer at a point disposed in advance of said transfer conveyer so as to stop discharge of said transfer conveyer onto said main line conveyer when said light beam is broken by material on said main line conveyer.

11. In a mobile loading station for shuttle cars, a wheel mounted transfer car including a body having open forward and rear ends and having a conveyer extending along its bottom, said body having a storage capacity slightly greater than the capacity of a shuttle car, a motor for driving said conveyer, a controller for starting said motor and connected therewith to connect said motor to drive said conveyer at a fast loading speed and a slower unloading speed, and a drive connection from said conveyer to said controller, for turning said controller to an off position when said conveyer has travelled a distance sufficient to discharge its entire load onto said main line conveyer.

12. In a mobile loading station for shuttle cars, a wheel mounted transfer car including a body having open forward and rear ends and having a conveyer extending along its bottom, said body having a storage capacity slightly greater than the capacity of a shuttle car, a motor for driving said conveyer, a controller for starting said motor and connected therewith to connect said motor to drive said conveyer at a fast loading speed and a slower unloading speed, and a drive connection from said conveyer to said controller, for turning said controller to an off position when said conveyer has travelled a distance sufficient to discharge its entire load onto said main line conveyer, said drive connection including means to permit said controller to be manually held from movement during operation of said conveyer to permit the operator to hold said controller against rotation of said drive connection, in a position to drive said transfer conveyer at a high speed.

13. In a mobile loading station for shuttle cars, a wheel mounted transfer car including a body having open forward and rear ends and having a conveyer extending along its bottom, said body having a storage capacity slightly greater than the capacity of a shuttle car, a motor for driving said conveyer, a controller for starting said motor and connected therewith to connect said motor to drive said conveyer at a fast loading speed and a slower unloading speed, and a drive connection from said conveyer to said controller, for turning said controller to an off position when said conveyer has travelled a distance sufficient to discharge its entire load onto said main line conveyer, said drive connection including a slip clutch arranged to permit said controller to be manually turned against said drive connection during operation of said motor and transfer conveyer, to permit the operator to move and hold said controller to a position to drive said transfer conveyer at a high speed during operation of said drive connection.

14. In a mobile loading station for shuttle cars, a wheel mounted transfer car including a body having open forward and rear ends and having a conveyer extending along its bottom, said body having a storage capacity slightly greater than the capacity of a shuttle car, a motor for driving said conveyer, a controller for starting said motor and connected therewith to connect said motor to drive said conveyer at a fast loading speed and a slower unloading speed, and a drive connection from said conveyer to said controller, for turning said controller to an off position when said conveyer has travelled a distance sufficient to discharge its entire load onto said main line conveyer, said drive connection including means to permit said controller to be manually held from movement during operation of said conveyer to permit the operator to hold said controller against rotation by said drive connection, to a position to drive said transfer conveyer at a high speed, and means having operative connection with said controller for stopping said conveyer when said controller is in position to connect said motor to drive said transfer conveyer at a slow discharging speed including a photoelectric relay having a light beam extending across said main line conveyer at a point disposed in advance of said transfer car, so as to stop discharge of said conveyer when said light beam is broken by material on said main line conveyer.

15. In an automatic loading station for shuttle cars, a main line conveyer, a transfer conveyer adapted to discharge onto said main line conveyer and having sufficient capacity to receive and store the entire load carried by a shuttle car, means for driving said transfer conveyer at the speed of unloading of said shuttle car when receiving the load discharged by said shuttle car, said means being operable to drive said transfer conveyer at a slower speed, for discharging its load onto said main line conveyer, and control means for said drive means accessible from said shuttle car, said control means being operable to permit the operator of the shuttle car to start said transfer conveyer at the speed of discharge of said shuttle car and being automatically operable to connect said drive means to drive said transfer conveyer at a slower discharge speed, for discharging onto said main line conveyer, as the shuttle car moves away from said transfer conveyer.

ROY S. BIGELOW.